United States Patent
Snyder (12)

(10) Patent No.: US 6,761,021 B1
(45) Date of Patent: Jul. 13, 2004

(54) SAND RAKE

(76) Inventor: Russell L. Snyder, 8423 SE. Sandy La., Hobe Sound, FL (US) 33455

( * ) Notice: Subject to any disclaimer, the term of this patent is extended or adjusted under 35 U.S.C. 154(b) by 0 days.

(21) Appl. No.: 10/053,729

(22) Filed: Jan. 18, 2002

(51) Int. Cl.$^7$ ................................. A01D 7/06
(52) U.S. Cl. ................ 56/400.06; 56/400.21; 56/400.04
(58) Field of Search ............. 56/400.04, 400.01, 56/400.05, 400.06, 400.07, 400.21; D8/13; D4/116; 206/349

(56) References Cited

U.S. PATENT DOCUMENTS

| | | | |
|---|---|---|---|
| 3,084,498 A | * 4/1963 | Straley | 56/400.04 |
| 3,584,739 A | * 6/1971 | Erichson et al. | 206/349 |
| 5,042,812 A | * 8/1991 | Tillman | 473/131 |
| D372,128 S | * 7/1996 | Beach et al. | D4/116 |
| 5,927,057 A | * 7/1999 | Hueber | 56/400.06 |

* cited by examiner

Primary Examiner—Robert E. Pezzuto
(74) Attorney, Agent, or Firm—Renner, Kenner, Greive, Bobak, Taylor & Weber

(57) ABSTRACT

A sand rake for grooming sand comprising a head portion having a lead edge and a drag edge; a handle extending from the head portion at an acute angle in the direction of the lead edge; a tine assembly having a plurality of tines and extending downwardly from the head portion proximate the lead edge, wherein the spacing between adjacent tines is adjustable and the depth to which the plurality of tines extends downwardly from the head portion is adjustable, the tine assembly serving to break-up and aerate sand; a brush extending downwardly from the head portion proximate the drag edge and in substantial alignment with the tine assembly, the brush serving to smooth out sand; and an entanglement material positioned between the tine assembly and the brush, and serving to remove debris from sand. Also provided is a rake receptacle in combination with the sand rake.

21 Claims, 2 Drawing Sheets

SAND RAKE

BACKGROUND OF THE INVENTION

The present invention generally relates to a sand rake, and, particularly, to a sand rake for grooming bunkers on a golf course.

A large majority of golf courses include bunkers of sand that are strategically placed along selected holes of the course in order to provide additional challenges to the golfer. To ensure that the play out of a bunker is fairly consistent, the sand in the bunker should be somewhat firm, although not compacted, and should have a uniform surface without substantial mounds or depressions within the sand. However, when a golf ball lands in a bunker, the golfer must necessarily enter the bunker and disturb the sand with footprints and the golf swing (or swings), causing compacting of the sand and the creation of mounds and depressions. Additionally, certain weather conditions, particularly rain, can compromise the desired quality of the sand within the bunker. Leaves and other debris settling within the bunker is undesirable as well because they may compromise the lie of the ball. Thus, bunkers need to be constantly maintenanced.

Bunkers are typically maintained by raking the sand. Bunker rakes of the prior art are, quite simply, a plurality of tines extending from a head portion that is attached to a handle for pulling the tines across the sand. These tines dig into the sand and break-up any compacted sand and help smooth out mounds and depressions. The tines are placed relatively far apart (on the order of about an inch or more) and, thus, while they do serve to provide the bunker with a substantially uniform surface, they will typically leave ridges in the sand. Also, while a golfer may be able to rake out larger debris, such as large twigs and leaves, the common rake does not specifically provide a means for removing debris, especially debris of smaller dimensions.

At most golf courses, the sand rake is simply laid on the ground near the bunker, from where it may be retrieved, by a golfer, for the purpose of maintaining the bunker. However, in this position, there is a chance that a golf ball approaching the bunker would hit the sand rake and have its true trajectory altered. It is believed that the prior art has never addressed this issue.

Thus, there exists a need in the art for a sand rake that can provide a substantially uniform surface within a bunker, without substantial ridges. There is also a need for a sand rake that can remove debris from the bunker, during the raking operation. Finally, there exist a need in the art for a sand rake that can be stored near a bunker in such a manner that substantially lessens the likelihood that a golf ball will hit the sand rake as it approaches the hole.

BRIEF SUMMARY OF THE INVENTION

In general, the present invention provides a sand rake that includes a head portion, a tine assembly, and a brush. The head portion has a lead edge and a drag edge. The tine assembly includes a plurality of tines that extend downwardly from the head portion proximate the lead edge. The brush extends downwardly from the head portion proximate the drag edge, and is in substantial alignment with the tine assembly. The tine assembly serves to break-up and aerate the sand, while the brush serves to smooth out the sand, particularly, the ridges created by the tine assembly.

In a more particular embodiment, the sand rake includes a debris assembly that serves to pick-up debris off of the sand during a raking operation. This debris assembly is positioned between the tine assembly and the brush. In particular embodiments, the debris assembly will include an entanglement material, such as textile materials with cut-pile surfaces, as, for example, synthetic turf materials like Astro-Turf™ (Southwest Recreational Industries, Inc., Texas) and Dirt Buster™ (Solutia Inc., Missouri). In some embodiments, the head portion may be attached to a handle that extends from the head portion at an acute angle in the direction of the lead edge. In other embodiments, the head portion may be adapted to fit onto industrial mobile sand groomers.

In more particular embodiments, the tine assembly of the sand rake includes two rows of tines, a stationary row and an adjustable row. Each row includes a plurality of tines that are spaced apart by a set distance, and the adjustable row of tines may be moved from a wide-tine position, wherein the tines of the adjustable row lie in registration with the tines of the stationary row, to a close-tine position, wherein the tines of the adjustable row lie between the tines of the stationary row. This potential for adjustment of the tine assembly is beneficial in that different tine spacings will be necessary to sufficiently break-up and aerate different types of sand. In further embodiments, the sand rake may also include spacers that connect between the tine assembly and the head portion in order to allow for adjustment of the depth of the downward extension of the plurality of tines.

Thus, in yet another embodiment, the present invention provides a sand rake for grooming sand comprising a head portion having a lead edge and a drag edge; a handle extending from the head portion at an acute angle in the direction of the lead edge; a tine assembly having a plurality of tines and extending downwardly from the head portion proximate the lead edge, wherein the spacing between adjacent tines is adjustable and the depth to which the plurality of tines extends downwardly from the head portion is adjustable, the tine assembly serving to break-up and aerate sand; a brush extending downwardly from the head portion proximate the drag edge and in substantial alignment with the tine assembly, the brush serving to smooth out sand; and an entanglement material position between the tine assembly and the brush, and serving to remove debris from sand.

Finally, the present invention also provides for a rake receptacle in combination with a sand rake. The rake receptacle has a beveled surface, which, in this embodiment, mates with a beveled end of the handle of a sand rake. When the sand rake is placed within the rake receptacle, the head portion of the sand rake is aligned in a desired position.

DETAILED DESCRIPTION OF THE INVENTION

Figure 1:
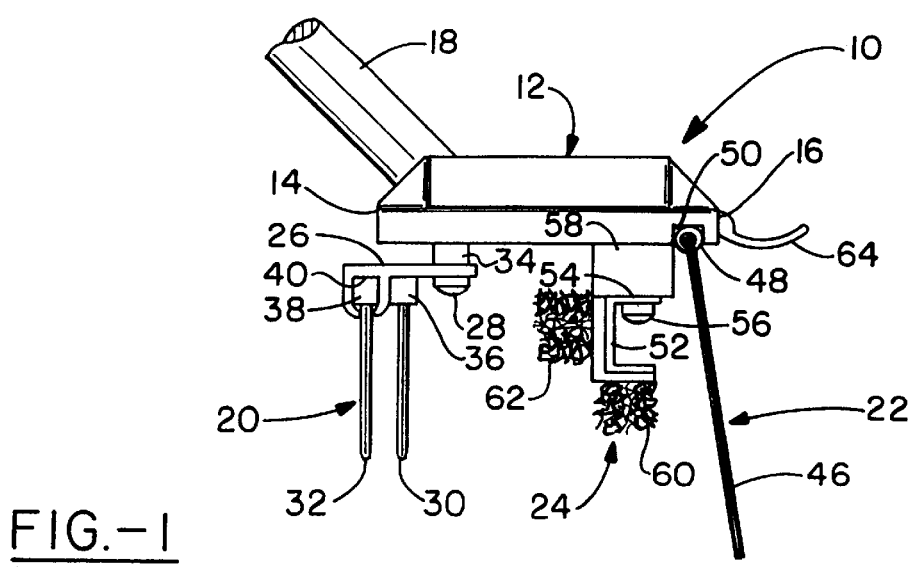
FIG. 1 is a right end elevational view of a sand rake according to the present invention, as taken with reference to FIG. 1.

With reference to FIG. 1, it can be seen that a sand rake in accordance with this invention is designated generally by the numeral 10. Sand rake 10 includes head portion 12, which has lead edge 14 and drag edge 16. Handle 18 releasably engages head portion 12 and extends therefrom at an acute angle in the direction of lead edge 14. Sand rake 10 functions through a pulling motion, such that lead edge 14 and drag edge 16 are aptly named. A pulling motion is preferably employed to rake sand with sand rake 10, and the acute extension of handle 18 from head portion 12 facilitates this pulling motion. Although less preferred, handle 18 may extend at an acute angle with respect to drag edge 16, in which case, sand rake 10 would rake sand through a pushing motion.

Tine assembly 20 extends downwardly from head portion 12, proximate lead edge 14, while brush assembly 22 extends at an angle downwardly from drag edge 16. A debris assembly 24 is attached to head portion 12 between tine assembly 20 and brush assembly 22. During a raking operation, tine assembly 20 serves to break-up and aerate compacted sand and provides a first stag of sand grooming. Debris assembly 24 serves as both an intermediate support for sand rake 10, and also serves to provide a second stag of sand grooming by removing debris that may be present in the sand. Brush assembly 22 provides the third and final stag of sand grooming by smoothing out the sand that has been broken-up by tine assembly 20 and cleaned by debris assembly 24. For a better appreciation of the function of each assembly 20, 22, and 24, each is considered in turn hereinbelow.

Figure 2:
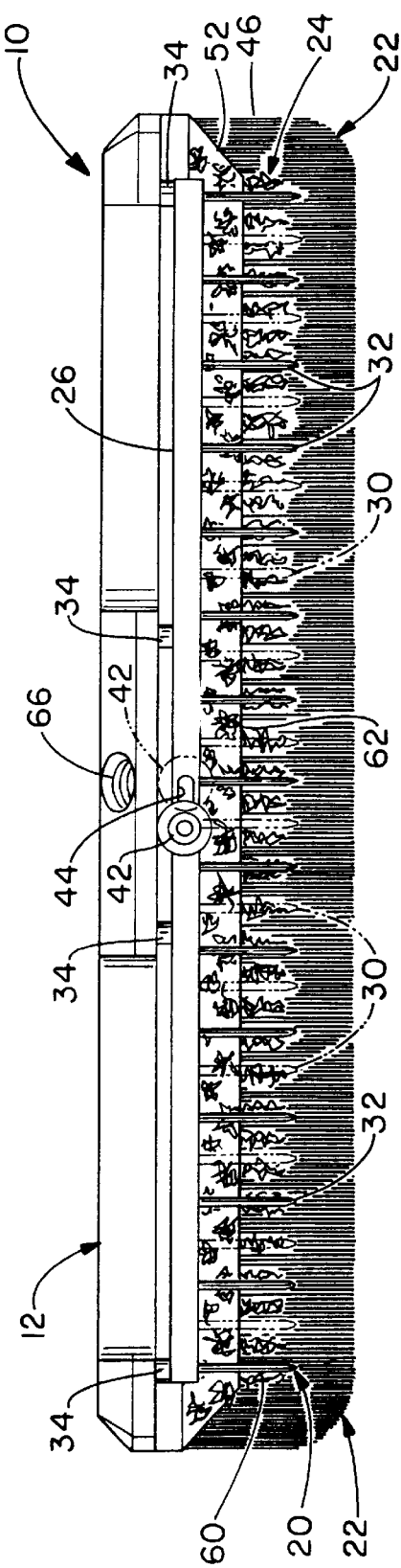
FIG. 2 is a front elevational view of a sand rake according to the present invention.

With reference to FIGS. 1 and 2, it can be seen that tine assembly 20 includes tine bracket 26, which is secured to head portion 12 by an appropriate fastener 28. Herein, fastener 28 is shown as a screw, although the present invention is not to be limited thereto. A plurality of stationary tines 30 and adjustable tines 32 are maintained within tine bracket 26 and extend downwardly therefrom. Spacers 34 of various sizes may optionally be employed to adjust the depth to which tines 30, 32 extend. It will be appreciated that different types of sand will require that tines 30, 32 extend to different depths in order for sand rake 10 to perform a satisfactory brushing operation. Course, compacted sand may require a greater depth of penetration for tines 30, 32, and, thus, larger spacers 34 may be necessary in sand rake 10 when employed to rake sand of this type. Fine, loose sand may require a lesser depth of penetration, and, thus, smaller spacers 34 might be sufficient for sand rake 10 when used to rake sand of that type. Notably, the preferred depth of penetration for tines 30, 32 will be easy to experimentally ascertain by adjusting the connection of tine bracket 26 to head portion 12 by either directly connecting tine bracket 26 to head portion 12 or by connecting tine bracket 26 to head portion 12 through the use spacers 34 of various sizes.

Stationary tines 30 and adjustable tines 32 are of the same length, which preferably ranges from about 1 inch to about 2 inches, with a length of 1⅝ inches being preferred. Notably, these are the preferred lengths for the tines 30, 32 themselves. The length to which tines 30, 32 extend downwardly in relation to head portion 12 will vary depending upon the size of spacer 34 employed, if any, as well as the dimensions of bases 36, 38. Although stated dimensions are not to be interpreted as limiting the scope of this invention, tines 30, 32 will extend downwardly, in relation to head portion 12, to a depth of from about 1¼ to about 2¼ inches.

Stationary tines 30 extend from stationary base 36, which, as shown in FIG. 1, is affixed to tine bracket 26. Optionally, stationary base 36 may either be molded as an integral part of tine bracket 26 or removable from tine bracket 26 for economic maintenance and/or replacement of stationary tines 30. Adjustable tines 32 extend from adjustable base 38, which rests within a track 40 of tine bracket 36.

Figure 3:
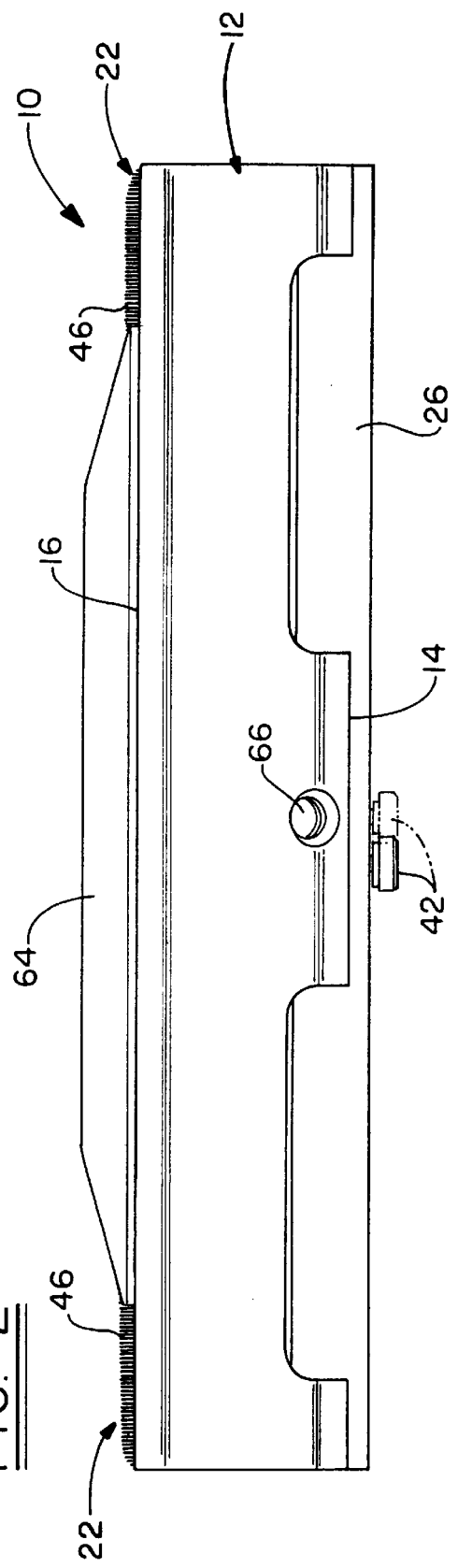
FIG. 3 is a top view of a sand rake according to the present invention.

With reference to FIGS. 1–3, it can be seen that adjustable base 38 is maintained in track 40 by set screw 42, which extends through slide slot 44, on the front of tine bracket 36, and engages adjustable base 38 through a threaded engagement. When the threaded engagement between set screw 42 and adjustable base 38 is tightened, set screw 42 contacts tine bracket 26 by clamping at slide slot 44 with sufficient force to maintain the position of adjustable base 38. However, this threaded engagement can be loosened such that set screw 42 and adjustable base 38 and associated adjustable tines 32 may be moved a maximum distance defined by the dimensions of slide slot 44.

This relationship between set screw 42, slide slot 44, tines 30, 32, and bases 36, 38 allows for the registration or non-registration of stationary tines 30 and adjustable tines 32 to provide for an adjustable distance between adjacent tines 30, 32. Particularly, with reference to FIG. 2, it can be seen that both stationary tines 30 and adjustable tines 32 are maintained a set distance apart on their respective bases 36, 38. Typically, the distance between adjacent tines 30, 32 on a given base 36, 38 will range from about ¾ to about 2 inches, with a spacing of 1½ inch being preferred. In the embodiment of this invention, as shown in the Figs. when set screw 42 is positioned at the left side of slide slot 44, stationary tines 30 and adjustable tines 32 are in registration, such that only one row of tines is actually visible, and the maximum distance between adjacent tines is realized. This may be considered the "wide-tine" position. As set screw 42 is slid toward the right, within slide slot 44, adjustable tines 32 will no longer be in registration with stationary tines 30, such that the distance between adjacent tines 30, 32 may be varied. When set screw 42 is slid all the way to the right within slide slot 44, adjustable tines 32 will be positioned at the midpoint of the distance between adjacent stationary tines 30, such that the distance between adjacent tines 30, 32 may be cut in half. This may be considered the "close-tine" position. Using the particularly preferred tine spacing of 1½ inch as an example, the adjustable position of adjustable tines 32 allows for the provision of tine spacings ranging from 1½ inch (when in "wide-tine" registration) to ¾inch, when adjustable tines 32 are placed at the mid point between stationary tines 30 (the "close-tine" position). It should again be noted, however, that the particular dimensions herein disclosed are to be non-limiting inasmuch as it may be experimentally determined that different types of sand require different tine spacings for an effective grooming of the sand.

Brush assembly 22 extends downwardly from a position proximate drag edge 16, and serves to smooth out the sand broken-up by tine assembly 20 without creating grooves or ridges within the sand. More particularly, brush assembly 22 includes bristles 46 that are clamped within a bracket 48. Bracket 48 is received within a track 50 positioned proximate drag edge 16 of head portion 12. Preferably, bracket 48 and associated bristles 46 may be removed from track 50 for maintenance or replacement, as necessary. In the present embodiment, a friction fit is employed. Bristles 46 closely resemble the bristles found on a common shop broom.

As can be seen in FIG. 1, in addition to extending downwardly from head portion 12, brush assembly 22 extends rearwardly at an angle off of perpendicular, as represented in FIG. 1 by angle A. Preferably, this angle ranges from about 10 to about 20°, with an angle of 17° being particularly preferred. This angle helps the bristles to glide along the sand and perform their smoothing function.

Brush assembly 22 is substantially aligned with tine assembly 20 and, by smoothing out the sand without creating ridges, provides a better appearance to the brushed sand than heretofore achieved with sand rakes of the prior art.

The tine assembly 20 and brush assembly 22 discussed hereinabove provide a sand rake 10 capable of grooming sand in a manner superior to those sand rakes heretofore known in the art. However, it has been found that the further provision of a debris assembly 24 between tine assembly 20 and brush assembly 22 provides further benefits. Debris assembly 24, when provided, serves to entangle and pick-up debris that may be found in the sand being groomed, such as small pebbles, twigs, seeds from trees, and the like. With particular reference to FIG. 1, it can be seen that debris assembly 24 includes a C-shaped bracket 52 that is secured to head portion 12 through top extension 54. Particularly, an appropriate fastener 56 extends through top extension 54 and spacer 58 to engage head portion 12. While fastener 56 is shown as being a screw, the present invention is not to be limited thereby.

Entanglement material 60, 62 is provided to extend both downwardly toward the ground and toward tine assembly 20. The downwardly extending entanglement material 60 serves as a buffer between the sand and the weight of sand rake 10, and this has been found to be beneficial in that it helps to prevent the sand rake 10 from digging too deeply into the sand being raked. Additionally, the downwardly extending entanglement material 60 may provide a secondary raking operation on the sand that has been broken-up by tine assembly 20. The downwardly extending entanglement material 60 may also serve to entangle debris, although it has been found that this function is most adequately performed by entanglement material 62.

Entanglement material 62 extends toward tine assembly 20 and entangles debris that may be present on the sand, while allowing sand to pass therethrough. More particularly, entanglement material 60, 62 is preferably a synthetic ribbon pile product, such as AstroTurf™ (Southwest Recreational Industries, Inc., Texas) or Dirt Buster™ (Solutia Inc., Missouri). When debris contacts these grass-like carpet structures, it becomes entangled therein, while the sand is allowed to pass therethrough, and, the debris is trapped within the debris assembly 24, from which it may be removed. With reference to FIG. 2, it can be seen that the entanglement material 60, 62 extends substantially along the entire length of head portion 12. Spacer 58 serves to place the entanglement material 62 at a position wherein it is aligned with tines 30, 32, and places entanglement material 60 at a depth substantially equivalent to or slightly greater than the depth to which tines 30, 32 extend, in order to provide the desired buffering function.

In FIGS. 1 and 3, it can be seen that a push-pull blade 64 is provided, extending from drag edge 16 of head portion 12. In a bunker, push-pull blade 64 will be found to be useful in moving significant amounts of sand to areas where the sand has become very thin. For instance, after it rains, it is common for sand to be washed down off of steep inclines within a bunker, such that the sand collects at the base of the incline. In such instances, sand rake 10 could be turned upside down, and push-pull blade 64 could be employed to push the accumulated sand back up the incline. As another example, sand could become thin at an area of the bunker that has been significantly used, and push-pull blade 64 could be used to push or pull sand from areas where large amounts of sand have accumulated to those thin areas. The convex shape of push-pull blade 64 is merely preferred, but aids in the movement of sand through either a push or pull motion.

Figure 4:
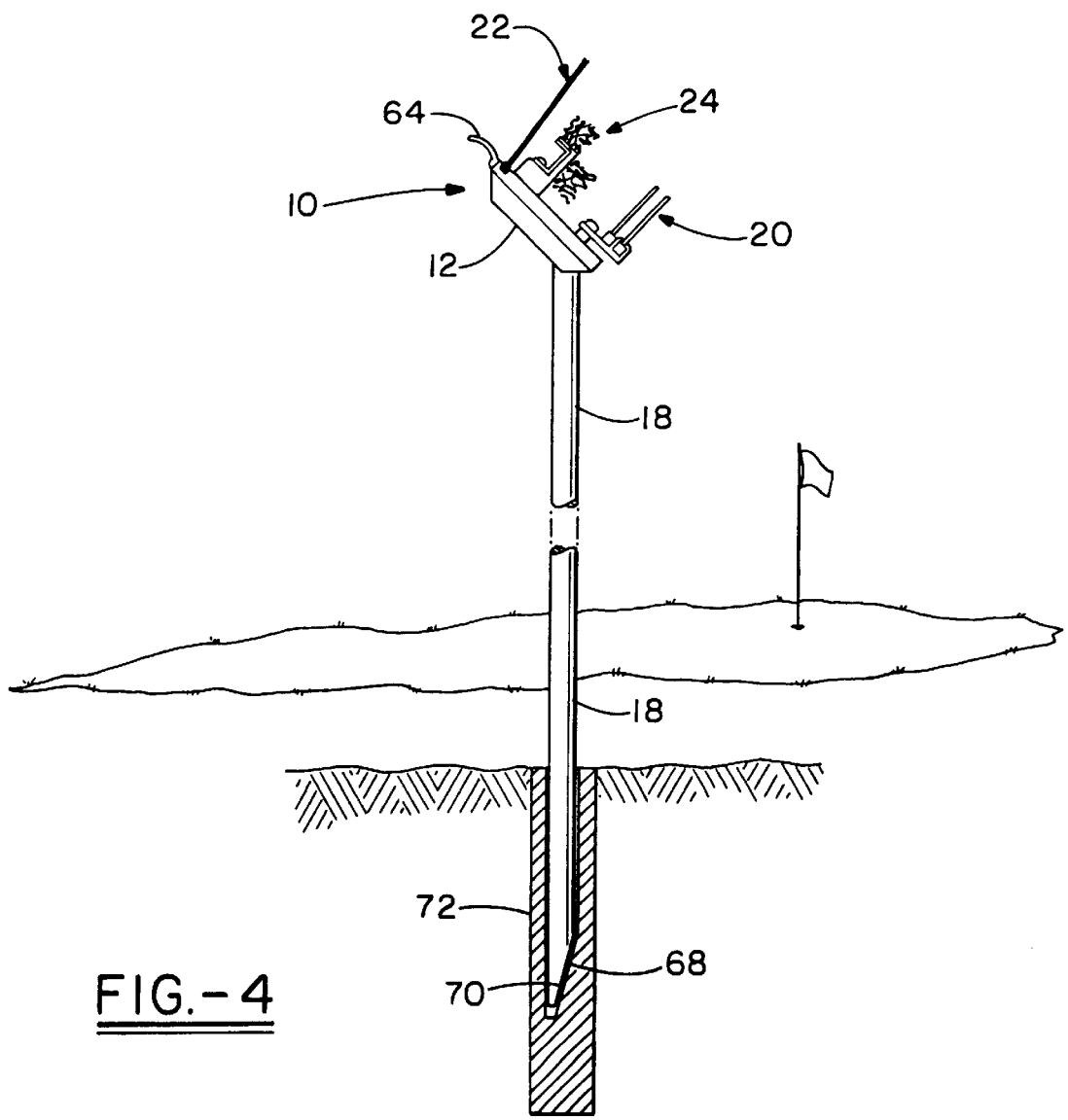
FIG. 4 is a side view of rake receptacle in combination with a sand rake according to the present invention, and generally represents the benefits of such combination for storing the sand rake.

With reference to FIGS. 2 and 3, it can be seen that handle 18 engages head portion 12 at a threaded bore 66. Such a means for engagement is generally known, however, the present invention is not to be limited thereto or thereby. Further aspects of handle 18 are apparent in FIG. 4. Therein, it can be seen that handle 18 has a beveled end 68. Beveled end 68 is provided to engage a beveled surface 70 provided at the bottom of a storage tube 72. Storage tube 72 would be provided somewhere near the bunker on which sand rake 10 is to be employed, and would serve to both store sand rake 10 and orient it in such a manner that it provides a small area of possible interference to an approaching golf shot. More particularly, the beveled surfaces would match up such that the length of head portion 12 would generally point toward the hole being approached.

It should be appreciated that head portion 12, with the associated tine assembly 20 and brush assembly 22, and, optionally and preferably, debris assembly 24, while being particularly suited for use by an individual, when attached to a handle 18, may alternatively be adapted to attach to industrial mobile sand groomers, which are known in the art.

In light of the foregoing, it should thus be evident that the process of the present invention, providing a golf sand rake, substantially improves the art. While, in accordance with the patent statutes, only the preferred embodiments of the present invention have been described in detail hereinabove, the present invention is not to be limited thereto or thereby. Based upon the disclosure herein, various alternative embodiments of a sand rake providing the benefits of the disclosed preferred embodiment may become apparent to those persons of ordinary skill in the art. Thus, the scope of this invention shall include all modifications and variations that fall within the scope of the attached claims.

What is claimed is:

1. A sand rake comprising:
   a head portion having a lead edge and a drag edge;
   a tine assembly affixed to said head portion and providing a plurality of tines extending downwardly in relation to said head portion proximate said lead edge, wherein the fixing of said tine assembly to said head portion is adjustable such that said plurality of tines may be configured to extend downwardly at different depths in relation to said head portion; and
   a brush extending downwardly from said head portion proximate said drag edge and in substantial alignment with said plurality of tines.

2. The sand rake of claim 1, further comprising:
   a handle extending from said head portion at an acute angle in the direction of said lead edge.

3. The sand rake of claim 1, further comprising a track proximate said drag edge, wherein said brush extends from said track.

4. The sand rake of claim 1, wherein said tine assembly is removably secured to said head portion, and further comprising a plurality of removable spacers that connect between said tine assembly and said head portion and serve to allow for adjustment of the depth of the downward extension of said plurality of tines.

5. The sand rake of claim 4, wherein said tine assembly includes a stationary row of tines and an adjustable row of tines, wherein the tines in each of said stationary and adjustable row are spaced apart by a set distance.

6. The sand rake of claim 5, wherein said adjustable row of tines slides within a track having an associated set screw for selectively allowing for the movement of and fixing of the positioning of said adjustable row of tines.

7. The sand rake of claim 1, wherein said handle has a beveled end.

8. The sand rake of claim 7, in combination with a rake receptacle having a beveled surface for mating with said beveled end of said handle of the sand rake for aligning the sand rake in a desired position.

9. The sand rake of claim 1, further comprising a push-pull blade extending from said drag edge.

10. A sand rake for grooming sand comprising:
a head portion having a lead edge and a drag edge;
a handle extending from said head portion at an acute angle in the direction of said lead edge;
a tine assembly having a plurality of tines and extending downwardly from said head portion proximate said lead edge, wherein the spacing between adjacent tines is adjustable and the depth to which said plurality of tines extends downwardly in relation to said head portion is adjustable, said tine assembly serving to break-up and aerate sand;
a brush extending downwardly from said head portion proximate said drag edge and in substantial alignment with said tine assembly;
said brush serving to smooth out sand; and
an entanglement material positioned between said tine assembly and said brush and serving to remove debris from sand.

11. A sand rake having a handle extending from a head portion in
combination with a rake receptacle for use on a golf course having a bunker and a
green with a hole, the combination comprising:
a beveled end provided on the handle of the sand rake; and
a beveled surface within the rake receptacle that mates with said beveled end of the handle and aligns the head portion of the sand rake in a single desired orientation with respect to the hole on the green.

12. A sand rake comprising:
a head portion having a lead edge and a drag edge;
a plurality of tines extending downwardly in relation to said head portion proximate said lead edge;
a brush extending downwardly from said head portion proximate said drag edge and in substantial alignment with said plurality of tines; and
a debris assembly separated and distinct from said brush and positioned between said tine assembly and said brush.

13. The sand rake of claim 12, wherein said debris assembly includes entanglement material for contacting and entangling debris during a raking operation.

14. The sand rake of claim 13, wherein said entanglement material is a grasslike ribbon pile material.

15. The sand rake of claim 14, wherein at least a portion of said entanglement material extends in the direction of said lead edge.

16. The sand rake of claim 15, wherein at least a portion of said entanglement material extends substantially perpendicularly downwardly in relation to said head portion.

17. The sand rake of claim 16, wherein said portion of said entanglement material extending substantially perpendicularly downwardly in relation to said head portion extends to a depth substantially equal to or slightly greater than the downward extension of said tine assembly.

18. A sand rake comprising:
a head portion having a lead edge and a drag edge;
a tine assembly affixed to said head portion, and providing a stationary row of times and an adjustable row of tines, wherein said adjustable row of tines may be moved from a wide-tine position, wherein the tines of said adjustable row lie in registration with the tines of said stationary row, to a close-tine position, wherein the tines of said adjustable row lie between the tines of said stationary row, said tine assembly extending downwardly in relation to said head portion proximate said lead edge; and
a brush extending downwardly from said head portion proximate said drag edge and in substantial alignment with said plurality of tines.

19. The sand rake of claim 18, wherein the fixing of said tine assembly to said head portion is adjustable such that said plurality of tines may be configured to extend downwardly at different depths in relation to said head portion.

20. The sand rake of claim 18, wherein the tines in each of said stationary row and said adjustable row are spaced apart by from about 1 to about 2 inches, and said adjustable row is adjustable such that, in said close-tine position, the distance between adjacent tines of said stationary row and said adjustable row may range from about 0.5 to about 1 inch.

21. The sand rake of claim 18, wherein the tines of said stationary row are spaced at 1½ inch intervals and the tines of said adjustable row are spaced at 1½ inch intervals, and said adjustable row may be moved such that, in said close-tine position, the distance between adjacent tines of said stationary row and said adjustable row may range up to ¾ inch.

* * * * *